(12) United States Patent
Fonk et al.

(10) Patent No.: US 11,645,489 B2
(45) Date of Patent: May 9, 2023

(54) IMPACT INDICATOR

(71) Applicant: ShockWatch, Inc., Dallas, TX (US)

(72) Inventors: Anthony N. Fonk, Austin, TX (US); Johannes A. van Niekerk, Dallas, TX (US); Alissa M. Fitzgerald, San Francisco, CA (US); Phillip W. Barth, Portola Valley, CA (US)

(73) Assignee: ShockWatch, Inc., Dallas, TX (US)

( * ) Notice: Subject to any disclaimer, the term of this patent is extended or adjusted under 35 U.S.C. 154(b) by 0 days.

(21) Appl. No.: 17/303,171

(22) Filed: May 21, 2021

(65) Prior Publication Data

US 2021/0365756 A1 Nov. 25, 2021

Related U.S. Application Data

(60) Provisional application No. 63/028,243, filed on May 21, 2020.

(51) Int. Cl.
*G06K 19/07* (2006.01)
*G01P 15/08* (2006.01)

(52) U.S. Cl.
CPC ...... *G06K 19/0723* (2013.01); *G01P 15/0802* (2013.01); *G06K 19/0717* (2013.01)

(58) Field of Classification Search
CPC ........... G06K 19/0723; G06K 19/0717; G06K 19/07749; G01P 15/0802; G01P 15/0891
See application file for complete search history.

(56) References Cited

U.S. PATENT DOCUMENTS

| 1,598,877 A | 9/1926 | Phelan et al. |
| 2,825,297 A | 3/1958 | Harrison |

(Continued)

FOREIGN PATENT DOCUMENTS

| DE | 19754653 | 9/1999 |
| GB | 826735 | 1/1960 |

(Continued)

OTHER PUBLICATIONS

DpiX; dpiX Foundry Capabilities Brochure; available from "https://www.dpix.com/technology-foundry/"; published at least as early as Aug. 12, 2020 (wayback machine Internet archive).

(Continued)

*Primary Examiner* — Quan Zhen Wang
*Assistant Examiner* — Rajsheed O Black-Childress
(74) *Attorney, Agent, or Firm* — Dority & Manning, P.A.

(57) ABSTRACT

An impact indicator includes a micro-sensor having a mass element configured to move from a first position to a second position in response to receipt by the mass element of an impact event. The micro-sensor includes detection circuitry configured to change from a first state to a second state in response to movement of the mass element from the first position to the second position. The detection circuitry is prevented from returning to the first state in response to changing to the second state. A radio-frequency identification (RFID) module is coupled to the detection circuitry and is configured to output a value indicating that the mass element is in the second position. An activator element is configured to maintain the mass element in the first position until removal of the activator element from the micro-sensor.

11 Claims, 7 Drawing Sheets

(56) References Cited

U.S. PATENT DOCUMENTS

| | | |
|---|---|---|
| 2,976,732 A | 3/1961 | Hautly |
| 3,021,813 A | 2/1962 | Rips |
| 3,312,188 A | 4/1967 | Lode et al. |
| 3,373,716 A | 3/1968 | Williams |
| 3,425,388 A | 2/1969 | West |
| 3,461,730 A | 8/1969 | Peters |
| 3,623,449 A | 11/1971 | Knutson |
| 3,707,722 A | 12/1972 | Itoh |
| 3,782,204 A | 1/1974 | Boardman |
| 3,835,809 A | 9/1974 | Sinn, Jr. |
| 3,909,568 A | 9/1975 | Greenhug |
| 4,060,004 A | 11/1977 | Scholz et al. |
| 4,068,613 A | 1/1978 | Rubey |
| 4,072,835 A | 2/1978 | Burke |
| 4,103,640 A | 8/1978 | Feder |
| 4,125,085 A | 11/1978 | Rubey |
| 4,177,751 A | 12/1979 | Rubey |
| 4,219,708 A | 8/1980 | Rubey |
| 4,237,736 A | 12/1980 | Wright |
| 4,239,014 A | 12/1980 | Rubey |
| 4,361,106 A | 11/1982 | Eklof |
| 4,470,302 A | 9/1984 | Carte |
| 4,528,851 A | 7/1985 | Ozols |
| 4,688,244 A | 8/1987 | Hannon et al. |
| 4,943,690 A | 7/1990 | Bitko |
| 4,982,684 A | 1/1991 | Rubey |
| 5,027,105 A | 6/1991 | Dailey et al. |
| 5,051,725 A | 9/1991 | Caccitolo |
| 5,153,561 A | 10/1992 | Johnson |
| 5,269,252 A | 12/1993 | Nagai |
| 5,323,729 A | 6/1994 | Rubey |
| 5,347,274 A | 9/1994 | Hassett |
| 5,351,539 A | 10/1994 | Ziegenbein et al. |
| 5,551,279 A | 9/1996 | Quick |
| 5,962,789 A | 10/1999 | Matsunaga et al. |
| 6,272,901 B1 | 8/2001 | Takeuchi et al. |
| 6,301,718 B1 | 10/2001 | Rigal |
| 6,313,417 B1 | 11/2001 | Schnell |
| 6,314,907 B1 | 11/2001 | Harris et al. |
| 6,367,408 B1 | 4/2002 | Gu |
| 6,685,094 B2 | 2/2004 | Cameron |
| 6,698,272 B1 | 3/2004 | Almirante |
| 6,848,389 B1 | 2/2005 | Elsasser et al. |
| 7,119,759 B2 | 10/2006 | Zehner et al. |
| 7,219,619 B2 | 5/2007 | Fitzer et al. |
| 7,353,615 B1 | 4/2008 | Branch |
| 7,509,835 B2 | 3/2009 | Beck |
| 7,673,513 B2 | 3/2010 | Gortler et al. |
| 7,918,179 B2 | 4/2011 | Pan et al. |
| 8,074,489 B2 | 12/2011 | Ishikawa et al. |
| 8,111,139 B2 | 2/2012 | Kess |
| 8,234,993 B2 | 8/2012 | Naruishi et al. |
| 8,234,994 B1 | 8/2012 | Branch |
| 8,240,270 B2 | 8/2012 | Naruishi |
| 8,307,775 B2 | 11/2012 | Naruishi et al. |
| 8,387,552 B2 | 3/2013 | Branch |
| 8,616,146 B2 | 12/2013 | Martin et al. |
| 8,646,401 B2 | 2/2014 | Branch |
| 8,863,683 B2 | 10/2014 | Branch et al. |
| 9,103,734 B2 | 8/2015 | Branch |
| 9,190,229 B2 | 11/2015 | Branch |
| 9,217,683 B2 | 12/2015 | Branch |
| 9,423,312 B2 | 8/2016 | Branch et al. |
| 9,502,196 B2 | 11/2016 | Branch |
| 2004/0231428 A1 | 11/2004 | Roberge |
| 2005/0039669 A1 | 2/2005 | Elsasser et al. |
| 2006/0220803 A1 | 10/2006 | Kranz et al. |
| 2007/0182578 A1 | 8/2007 | Smith |
| 2007/0194943 A1 | 8/2007 | Fitzer et al. |
| 2007/0273463 A1 | 11/2007 | Yazdi |
| 2008/0202258 A1 | 8/2008 | Amin et al. |
| 2008/0307884 A1 | 12/2008 | Gortler et al. |
| 2009/0307827 A1 | 12/2009 | Aspray |
| 2010/0050733 A1 | 3/2010 | Naruishi |
| 2010/0190485 A1 | 7/2010 | Engelhart, Sr. |
| 2011/0100124 A1 | 5/2011 | Zedesky et al. |
| 2011/0139060 A1 | 6/2011 | Sheau-Shi et al. |
| 2011/0219852 A1 | 9/2011 | Kasten |
| 2011/0254665 A1 | 10/2011 | Lindsey et al. |
| 2012/0227661 A1 | 9/2012 | Branch et al. |
| 2012/0312224 A1 | 12/2012 | Branch |
| 2014/0033964 A1 | 2/2014 | Frangi et al. |
| 2015/0082861 A1 | 3/2015 | Gibson et al. |
| 2016/0131552 A1 | 5/2016 | Naumann |
| 2019/0128754 A1* | 5/2019 | Fonk ............... H04L 9/0637 |

FOREIGN PATENT DOCUMENTS

| | | |
|---|---|---|
| GB | 1409847 | 10/1975 |
| JP | S36-28494 | 10/1961 |
| JP | S57-142363 | 9/1982 |
| JP | 2006300768 | 11/2006 |
| JP | 2009156726 | 7/2009 |
| WO | 2008060003 | 5/2008 |
| WO | 2019083655 | 5/2019 |

OTHER PUBLICATIONS

Wikipedia; Liquid-crystal display; available from "https://en.wikipedia.org/wiki/Liquid-crystal_display"; Jul. 2001.

Samsung; Step-by-Step LCD Manufacturing Process; available from "https://pid.samsungdisplay.com/en/learning-center/blog/samsung-display-lcd-manufacturing-process-step-step"; Nov. 2016.

Universal Display Corporation; Flexible OLEDs (FOLEDs); available from "https://oled.com/oleds/flexible-oleds-foleds/"; published at least as early as Nov. 16, 2018 (wayback machine Internet archive).

Laserfocusworld; Pixtronix micro-shutter MEMS display consumes much less power; available from "https://www.laserfocusworld.com/home/article/16548041/pixtronix-microshutter-mems-display-consumes-much-less-power"; Jan. 2011.

International Search Report and Written Opinion; PCT Application No. PCT/US2021/033750; dated Sep. 14, 2021.

* cited by examiner

IMPACT INDICATOR

BACKGROUND

During manufacturing, storage or transit, many types of objects need to be monitored due to the sensitivity or fragility of the objects. For example, some types of objects may be susceptible to damage if dropped or a significant impact is received. Thus, for quality control purposes and/or the general monitoring of transportation conditions, it is desirable to determine and/or verify the environmental conditions to which the object has been exposed.

BRIEF SUMMARY

According to one aspect of the present disclosure, a device and technique for impact detection is disclosed. The impact indicator includes a micro-sensor having a mass element configured to move from a first position to a second position in response to receipt by the mass element of an impact event. The micro-sensor includes detection circuitry configured to change from a first state to a second state in response to movement of the mass element from the first position to the second position. The detection circuitry is prevented from returning to the first state in response to changing to the second state. A radio-frequency identification (RFID) module is coupled to the detection circuitry and is configured to output a value indicating that the mass element is in the second position. An activator element is configured to maintain the mass element in the first position until removal of the activator element from the micro-sensor.

According to another embodiment of the present disclosure, an impact indicator includes a substrate having a communications module inlay configured to communicate an actuation status of the indicator. A micro-sensor is communicatively coupled to the communications module inlay for detecting an impact event. The micro-sensor has irreversible detection circuitry configured to detect the actuation status. An activator element is configured to maintain the micro-sensor in a non-reactive state until removal of the activator element from the micro-sensor.

According to yet another embodiment of the present disclosure, an impact indicator includes a micro-sensor configured to activate in response to receipt by the micro-sensor of an impact event where the micro-sensor includes detection circuitry configured to change from a first state to a second state in response to the activation of the micro-sensor. The detection circuitry is configured to prevent returning to the first state in response to the activation. A radio-frequency identification (RFID) module is coupled to the detection circuitry and is configured to output a value indicating that the micro-sensor has been activated. An activator element is configured to maintain the micro-sensor in a non-reactive state until removal of the activator element from the micro-sensor.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Embodiments of the present disclosure provide a device and technique for impact detection and indication. According to one embodiment, an impact indicator includes a micro-sensor having a mass element configured to move from a first position to a second position in response to receipt by the mass element of an impact event. The micro-sensor includes detection circuitry configured to change from a first state to a second state in response to movement of the mass element from the first position to the second position. The detection circuitry is prevented from returning to the first state in response to changing to the second state. A radio-frequency identification (RFID) module is coupled to the detection circuitry and is configured to output a value indicating that the mass element is in the second position. An activator element is configured to maintain the mass element in the first position until removal of the activator element from the micro-sensor. Embodiments of the present disclosure enable impact and/or acceleration event detection using no internal power supply. The RFID module can detect the state of the switch circuitry and emit or output a value indicating the actuation status of the indicator. For example, in some embodiments, an RFID reader can be used to activate the RFID module and determine an actuation status of the impact indicator device. Additionally, embodiments of the present invention utilize a micro-sensor (e.g., micro-mechanical and/or micro-electronic components) to detect impact or acceleration events having circuitry that results in the irreversabilty of the actuation status of the indicator after detecting the impact event. Further, embodiments of the present invention enable field-activation of the indicator (i.e., maintaining the indicator in a non-reactive state) so that impact events detected prior to the intended application of the indicator do not unintentionally actuate the indicator.

Figure 1:
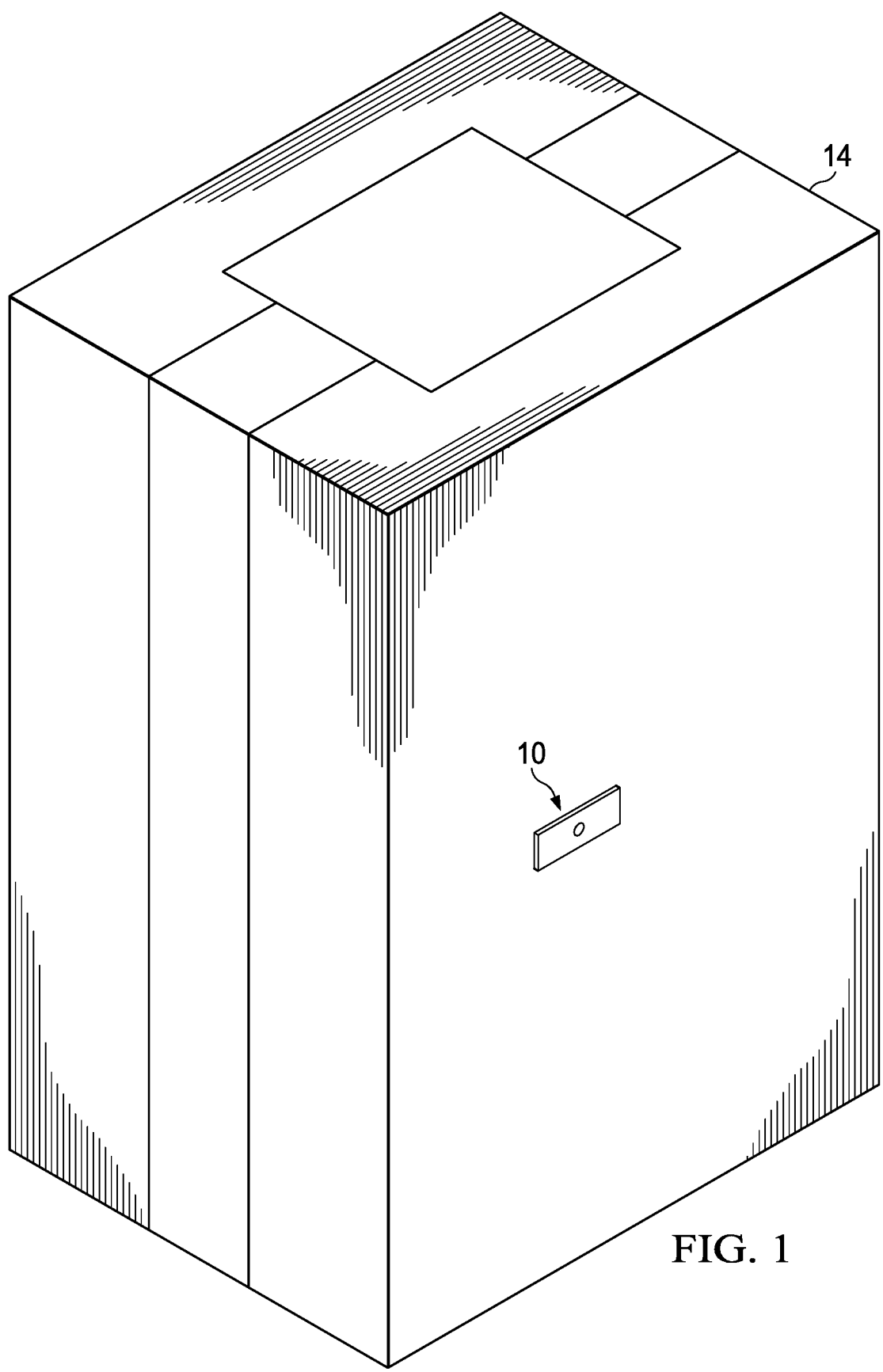
FIG. 1 is a diagram illustrating an application of an embodiment of an impact indicator according to the present disclosure.

With reference now to the Figures and in particular with reference to FIG. 1, an exemplary diagram of an impact indicator 10 is provided in which illustrative embodiments of the present disclosure may be implemented. In FIG. 1, impact indicator 10 is a portable device configured to be affixed to or disposed within a transport container 14 containing an object of which impact and/or acceleration events associated therewith are to be monitored. Embodiments of impact indicator 10 monitor whether an object has been exposed to an impact or some level of an acceleration event during manufacturing, storage, use, and/or transport of the object. In some embodiments, impact indicator 10 may be affixed to a transport container 14 using, for example, adhesive materials, permanent or temporary fasteners, or a variety of different types of attachment devices. The transport container 14 may include a container in which a monitored object is loosely placed or may comprise a container/surface of the monitored object itself. It should be appreciated that FIG. 1 is only exemplary and is not intended to assert or imply any limitation with regard to the environments in which different embodiments may be implemented.

Figure 2:
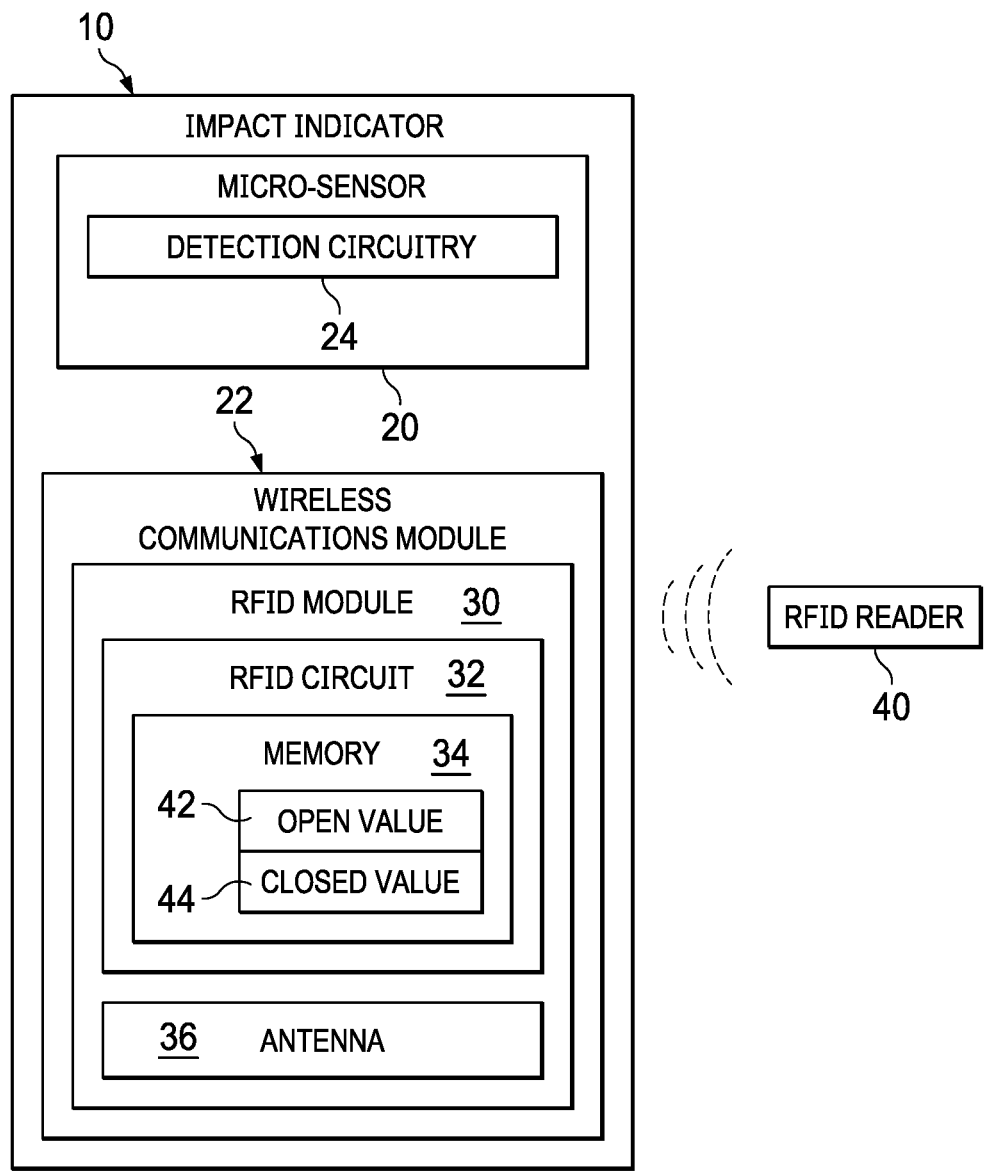
FIG. 2 is a is a block diagram illustrating an embodiment of an impact indicator according to the present disclosure.

FIG. 2 is a block diagram representing and illustrating an embodiment of indicator 10 in accordance with an embodiment of the present disclosure. In FIG. 2, indicator 10 includes a micro-sensor 20 and a wireless communications module 22. Micro-sensor 20 is a micro-mechanical and/or micro-electronic device (e.g., a microscopic device or system (e.g., generally having micrometer-sized components with an overall size generally measured in square millimeters)) for detecting an impact/acceleration event. Micro-sensor 20 may be configured as a microelectromechanical systems (MEMS) device (e.g., using silicon or other materials in the process or technique of deposition of material layers, patterning by photolithography, and etching to produce the required shape/components), a liquid crystal display (LCD) panel-fabricated device (e.g., a device manufactured using glass components and/or a glass substrate via LCD fabrication processes such as patterning, laminating, masking, cutting, and thin-film transistor (TFT) deposition techniques, which may or may not include liquid crystal), and/or be formed using roll-to-roll (R2R) processing techniques (e.g., creating the device on a roll of flexible plastic, metal foil, or flexible glass).

In some embodiments, micro-sensor 20 includes detection circuitry 24. Detection circuitry 24 may comprise one or more switch elements, traces, contacts, and/or circuits that are responsive to detecting a change in an actuation status of sensor 20. For example, in some embodiments, sensor 20 may include a movable element or member that moves or becomes displaced in response to being subjected to an impact event. The displacement of the movable element may cause a state change in circuitry 24 (e.g., a change in impedance, changing from an open circuit condition to a closed circuit condition, or vice versa, etc.). Wireless communications module 22 is configured to wirelessly communicate information associated with a state of circuitry 24 indicating the actuation state of indicator 10 (e.g., based on an open or closed circuit state of circuitry 24). For example, in one embodiment, wireless communications module 22 includes an RFID module 30. In some embodiments, RFID module 30 comprises a passive RFID module 30 (e.g., a passive RFID tag) having an RFID integrated circuit or circuitry 32 (e.g., disposed on or as part of a printed circuit board) and a memory 34, along with an antenna 36. As a passive RFID module 30, indicator 10 does not contain a battery (e.g., power is supplied by an RFID reader 40), thereby forming a battery-free impact indicator 10. For example, when radio waves from reader 40 are encountered by module 30, antenna 36 forms a magnetic field, thereby providing power to module 30 to energize circuit 32. Once energized/activated, module 30 may output/transmit information encoded in memory 34. However, it should be understood that, in some embodiments, RFID module 30 may comprise an active RFID module 30 including a power source (e.g., a battery) that may be configured to continuously, intermittently, and/or according to programmed or event triggers, broadcast or transmit certain information. One embodiment of a passive RFID tag is a flex circuit RFID in a roll form. In flex circuit RFIDs, the chip and antenna are embedded onto a thin substrate of 100 to 200 nm using, for example, polyvinyl chloride (PVC), polyethylenetherephtalate (PET), phenolics, polyesters, styrene, or paper via copper etching or hot stamping. One process for RFID manufacture is screen printing using conductive ink containing copper, nickel, or carbon. An example of a commercially available flex circuit passive RFID tag product that can come hundreds or even thousands in a roll is the Smartrac™ product from Avery Dennison Corporation.

It should also be understood that wireless communications module 22 may be configured for other types of wireless communication types, modes, protocols, and/or formats (e.g., short-message services (SMS), wireless data using General Packet Radio Service (GPRS)/3G/4G or through public internet via Wi-Fi, or locally with other radio-communication protocol standards such as Wi-Fi, Z-Wave, ZigBee, Bluetooth®, Bluetooth® low energy (BLE), LoRA, NB-IoT, SigFox, Digital Enhanced Cordless Telecommunications (DECT), or other prevalent technologies). As will be described further below, in response to receipt of a particular level and/or magnitude of a shock/acceleration event, impact indicator 10 functions as a passive impact sensor/indicator that can be used as part of an electronic signal or circuit. In some embodiments, the impact sensing capabilities/functions of impact indicator 10 of the present disclosure needs no power while in the monitoring state.

In the illustrated embodiment, memory 34 includes at least two different stored and/or encoded values 42 and 44. For example, value 42 may correspond to a value outputted/transmitted by module 30 when detection circuitry 24 is in an open circuit condition or state, and value 44 may correspond to a value outputted/transmitted by module 30 when detection circuitry 24 is in a closed circuit condition or state. As an example, the value 44 may represent an RFID tag identification (ID) number not having an activated impact detection circuitry 24, and the RFID tag's ID number may have an additional character (e.g., "0") placed at the end thereof. Value 42 may represent the RFID ID number having an activated impact detection circuitry 24, and the RFID tag's ID number may have an additional character at the end thereof being different from the additional character carried by value 44 (e.g., "1"). In the illustrated embodiment, RFID module 30 (e.g., circuitry 32) is coupled to detection circuitry 24 and can detect whether detection circuitry 24 is in an open or closed circuit condition or state. Thus, for example, detection circuitry 24 may initially be in closed circuit condition or state. Thus, if energized/activated, module 30 would transmit value 44 to reader 40. If indicator were to be subject to an impact event, sensor 20 may cause a change in circuitry 24 that would result in circuitry 24 being in an open circuit condition or state. Thus, if now energized/activated (e.g., after the impact event), module 30 would instead transmit value 42 to reader 40. Thus, embodiments of the present invention enable indicator 10 to monitor sensitive products/objects to which it is attached for potential damage caused by shock using electronic indicators (e.g., RFID readers) while indicator 10 does not contain or require any internal power source (e.g., a battery). In some embodiments, detection circuitry 24 is configured to be irreversible such that once a change in state of the detection circuitry 24 occurs, the detection circuitry 24 is prevented from returning to a prior state. For example, if detection circuitry 24 is in a closed circuit state or condition prior to sensor 20 actuation, and an impact event causes an actuation of sensor 20 that also causes detection circuitry 24 to transition to an open circuit state or condition, detection circuitry 20 is configured to be maintained in the open circuit state, thereby unable to return to the closed circuit state. Thus, embodiments of the present invention prevent any unauthorized resetting of impact indicator 10.

The present invention may include computer program instructions at any possible technical detail level of integration (e.g., stored in a computer readable storage medium (or media) (e.g., memory 34) for causing a processor to carry out aspects of the present invention. Computer readable program instructions described herein can be downloaded to respective computing/processing devices (e.g., communications module 22 and/or RFID module 30). Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages. In some embodiments, electronic circuitry (e.g., circuitry 32) including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to illustrations and/or block diagrams of methods and/or apparatus according to embodiments of the invention. It will be understood that each block of the illustrations and/or block diagrams, and combinations of blocks in the illustrations and/or block diagrams, may represent a module, segment, or portion of code, can be implemented by computer readable program instructions. These computer readable program instructions may be provided to a processor or other programmable data processing apparatus to produce a machine, such that the instructions, which execute via the processor, create means for implementing the functions/acts specified in the illustrations and/or block diagram block or blocks. These computer readable program instructions may also be stored in a computer readable storage medium that can direct a computing device, a programmable data processing apparatus, and/or other devices to function in a particular manner, such that the computer readable storage medium having instructions stored therein comprises an article of manufacture including instructions which implement aspects of the function/act specified in the illustrations and/or block diagram block or blocks. Detection circuitry 24, wireless communications module 22, and/or RFID module 30 may be implemented in any suitable manner using known techniques that may be hardware-based, software-based, or some combination of both. For example, detection circuitry 24, wireless communications module 22, and/or RFID module 30 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system). As will be appreciated by one skilled in the art, aspects of the present disclosure may be embodied as a system, method or computer program product. Accordingly, aspects of the present disclosure may take the form of a hardware embodiment, a software embodiment (including firmware, resident software, micro-code, etc.) or an embodiment combining software and hardware aspects that may all generally be referred to herein as a "circuit," "module" or "system."

Figure 3:
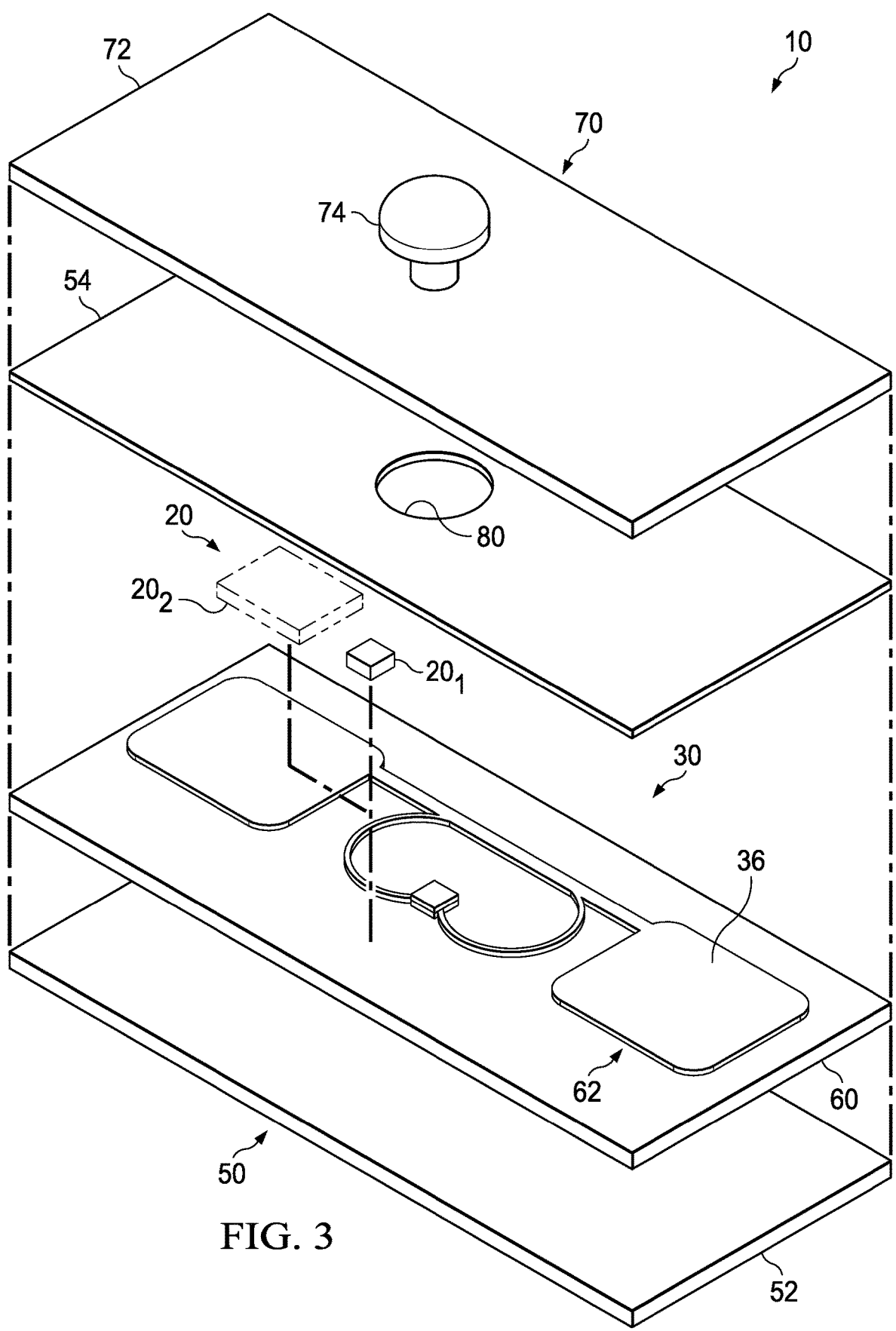
FIG. 3 is a diagram illustrating an exploded view of an embodiment of an impact indicator according to the present disclosure.
Figure 4:
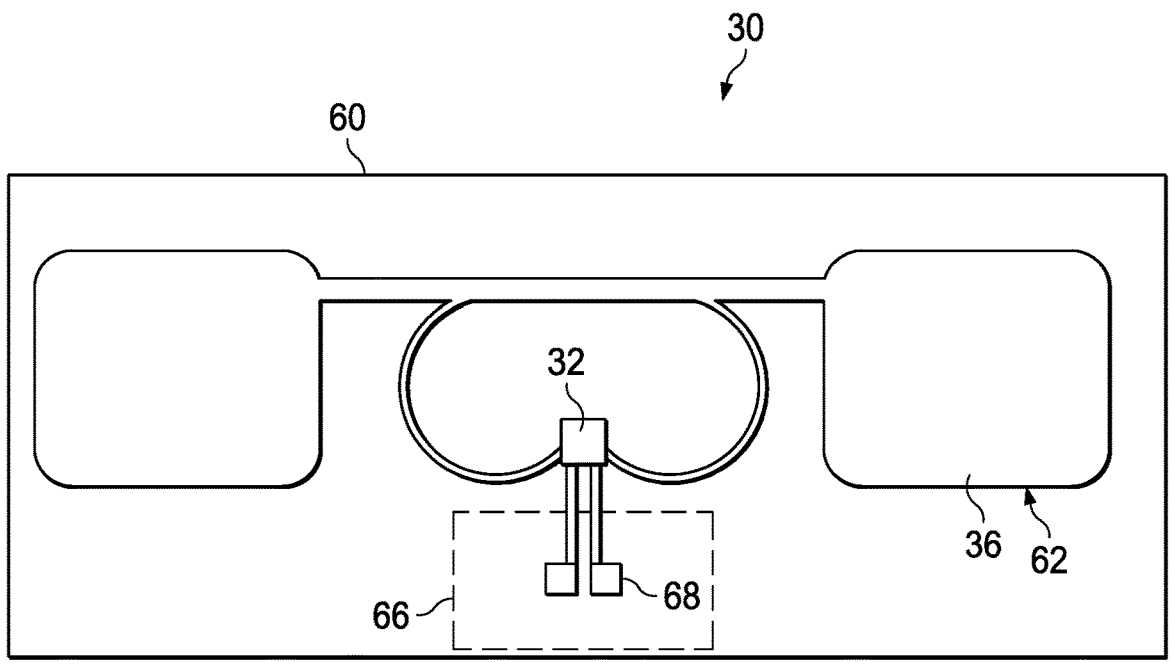
FIG. 4 is a diagram illustrating an enlarged view of a portion of the impact indicator illustrated in FIG. 3 in accordance with the present disclosure.

FIG. 3 is a diagram illustrating an exploded view of various embodiments of the impact indicator 10 according to the present disclosure, and FIG. 4 is a diagram illustrating an enlarged view of a portion of an embodiment of the impact indicator 10 depicted in FIG. 3 according to the present disclosure. Referring to FIG. 3, indicator 10 includes a case or housing 50 having a bottom or lower wall 52 and a top or upper wall 54. Between the upper and lower walls 54 and 52, respectively, is RFID module 30. FIG. 4 illustrates an enlarged view of RFID module 30. In FIGS. 3 and 4, RFID module 30 includes a substrate 60 having an RFID inlay 62 forming antenna 36 along with the RFID chip or circuit 32 coupled thereto. In the illustrated embodiment, micro-sensor 20 is adhered and/or coupled to RFID module 30. For example, in the illustrated embodiment, sensor 20 may include a MEMS sensor $20_1$ or a LCD panel-fabricated sensor $20_2$. Referring to FIG. 4, RFID module 30 includes a mounting area 66 for receiving micro-sensor 20, and RFID module 30 also includes traces or leads 68 for communicatively and/or electrically coupling sensor 20 to RFID circuit 32.

Referring to FIG. 3, in the illustrated embodiment, indicator 10 includes an activator element 70. Activator element 70 is configured to maintain sensor 20 in a non-reactive state (i.e., unable to transition from an unactuated state to an actuated state where the unactuated state refers to a state of sensor 20 prior to receipt by the sensor 20 of an impact event above a certain threshold and the actuated state refers to a state of sensor 20 after sensor has been subjected to an impact event at or above the threshold) until removal of activator element 70 from indicator 10. For example, during shipment of indicator 10 to an end user (or otherwise), indicator 10 may be subjected to an impact event that would be detected by sensor 20 and cause sensor 20 to be in an actuated state (i.e., indicating the receipt of an impact event). Activator element 70 prevents sensor 20 from transitioning from an unactuated state to an actuated state even if an impact event is experienced by sensor 20. Removal of activator element 70 from indicator 10 places sensor 20 in an active or sensing mode (i.e., capable of detecting an impact event and transitioning to an actuated state to indicate the receipt of the impact event).

For example, as will be described in greater detail below, in one embodiment, activator element 70 includes a retention element 72 that is adhesively adhered and/or otherwise coupled to upper wall 54 that includes an obstructer 74 that extends downward through an opening 80 formed in upper wall 54. Obstructer 74 may be in the form of a pin or other structural member that extends downward and engages at least a portion of sensor 20 to prevent sensor 20 from actuating. In operation, removal of retention element 72 from indicator 10 (e.g., peeling retention element 72 away from upper wall 54) also results in obstructer 74 being pulled outwardly from indicator 10, thereby disengaging from sensor 20 and enabling sensor 20 to be actuated in response to sensor 20 detecting an impact event.

Figure 5:
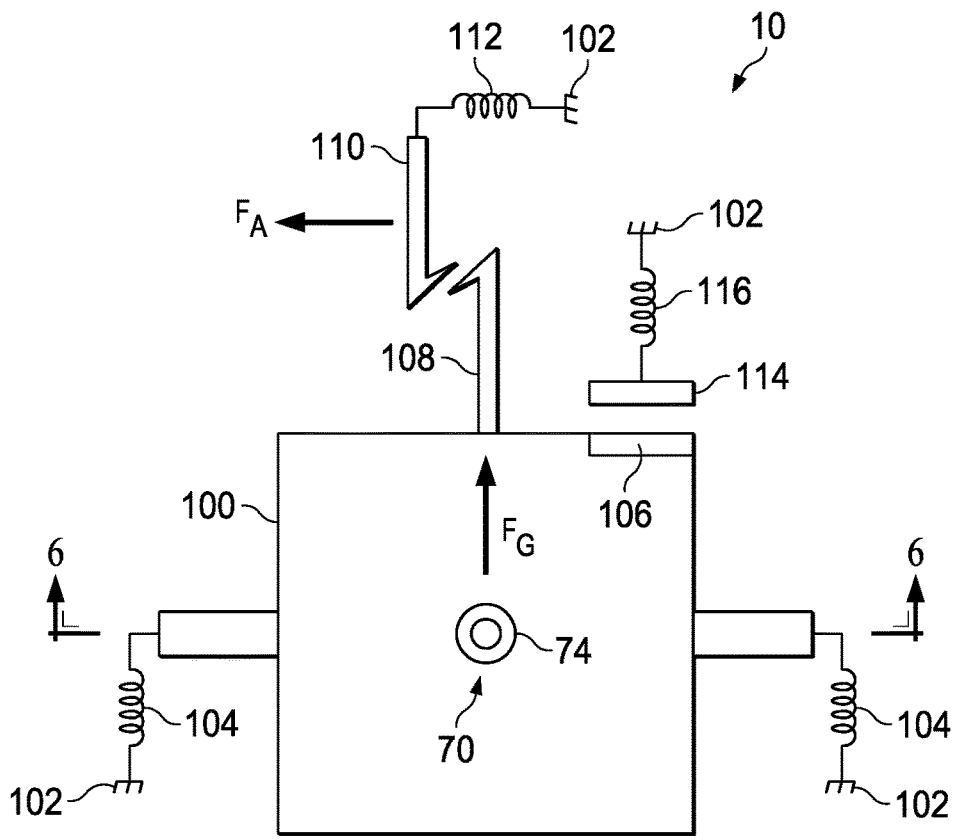
FIG. 5 is a diagram illustrating an embodiment of a micro-sensor of the impact indicator of FIGS. 3 and 4 according to the present disclosure.
Figure 6:
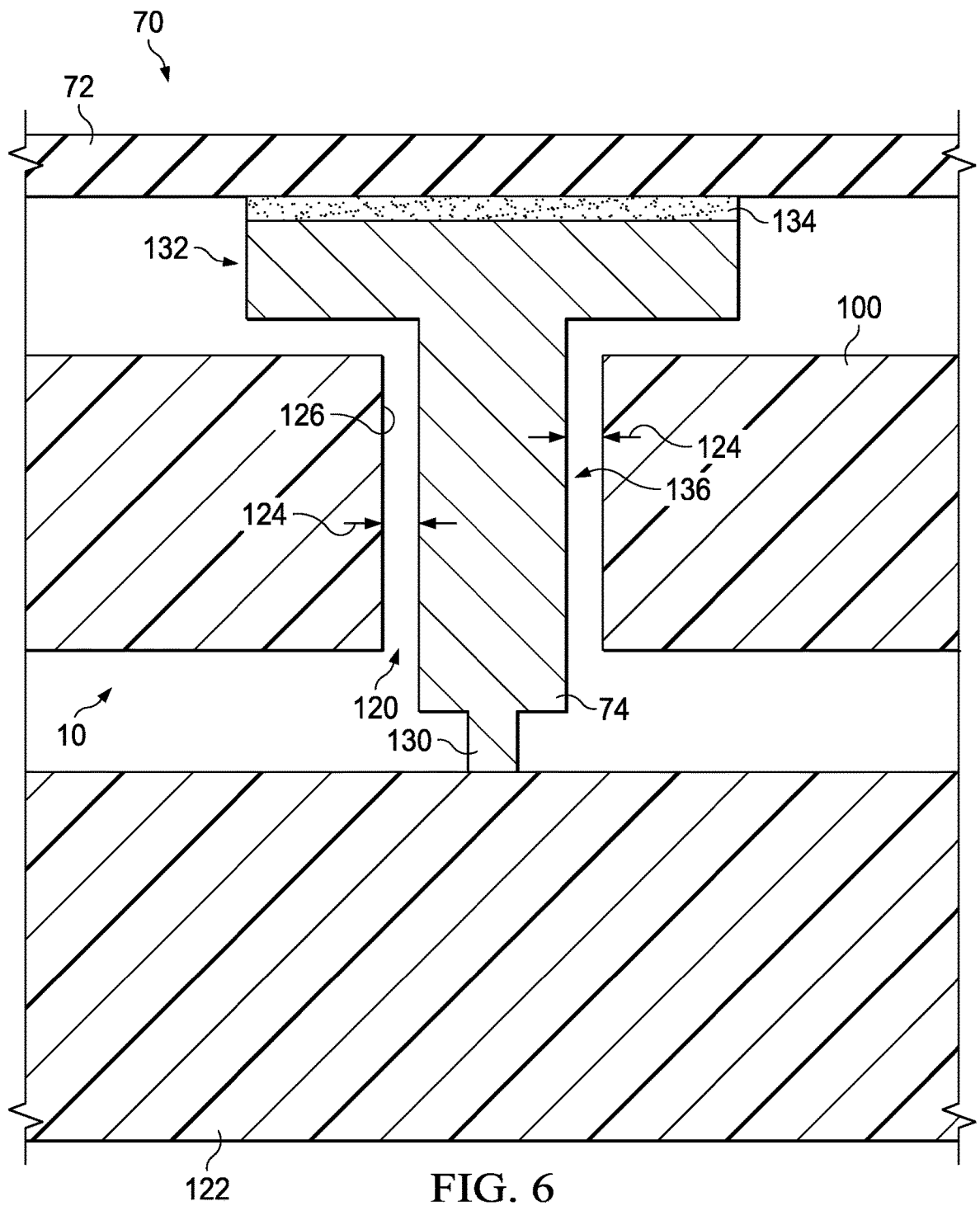
FIG. 6 is a diagram illustrating a section view of a portion of the impact indicator of FIG. 5 taken along the line 6-6 of FIG. 5 in accordance with the present disclosure.

FIG. 5 is a diagram illustrating an embodiment of impact indicator 10 incorporating a MEMS-type micro-sensor 20 according to the present disclosure, and FIG. 6 is a diagram illustrating a section view of the indicator 10 of FIG. 5 along the line 6-6 of FIG. 5. Various aspects of the operational characteristics of this embodiment of indicator 10 according to the present disclosure may be found in U.S. Pat. No. 7,266,988 which is incorporated by reference herein in its entirety. In FIGS. 5 and 6, indicator 10 utilizes a micromachined proof mass element 100 attached to a substrate (not illustrated) via anchors 102 through proof mass flexures 104. The proof mass element 100 includes a contact area 106 and a latch 108. In response to experiencing an impact event or shock load, the inertia of the proof mass element 100 a force, indicated by the term $F_G$ in FIG. 5, that displaces the mass element 100 sufficiently to force the latch 108 to engage with a similar latch on a thin pawl 110 attached to the substrate via anchor 102 through pawl flexure 112. If the force $F_G$ meets a desired threshold, the movement of latch 108 contacts pawl 110 and yields a force, indicated by the term $F_A$ in FIG. 5, that moves pawl 110 roughly perpendicular to the motion of proof mass element 100 so that latch 108 and pawl 110 can latch together. The force $F_G$ also causes the proof mass contact area 106 to connect with a contact 114 that is attached to the substrate via anchor 102 through contact flexure 116. After latching, contact area 106 remains in contact with contact 114.

In the illustrated embodiment, impact indicator 10 includes activator element 70 so that during manufacturing, storage, and/and shipment of indicator 10 (e.g., prior to indicator 10 being placed on an item of impact monitoring interest), proof mass element 100 does not move a sufficient distance toward pawl 110 so that a latching occurs with latch 108 even if sensor 20 has been exposed to the threshold of shock. As illustrated in FIGS. 5 and 6, proof mass element 100 is formed having an opening 120 therein with obstructer 74 extending at least partially into opening 120 and proximate mass element 100 to thereby limit movement of mass element 100 in the event sensor 20 experiences an impact or shock event. It should be understood that obstructer 74 may be otherwise located and/or positioned proximate proof mass element 100 to thereby limit and/or prevent movement of proof mass element 100 to the point where sensor 20 would be in an actuated position or state (e.g., located along a side of proof mass element 100 near latch 108).

Referring to FIG. 6, in the illustrated embodiment, obstructer 74 is anchored and/or coupled to a substrate 122 of sensor 20. For example, in some embodiments, obstructer 74 is formed using MEMS manufacturing techniques in opening 120 of proof mass element 100. In at least one direction, obstructer 74 is formed a distance identified as reference 124 in FIG. 6 from an edge or surface 126 of opening 120. Unlike proof mass element 100, obstructer 74 is configured to be detached from substrate 122 at its proximal end 130 relative to substrate 122. For example, since proof mass element 100 moves during a shock event because mass element 100 is attached to substrate 122 using flexures 104, proof mass element 100 may move relative to obstructer 74. If the shock event would otherwise result in a movement of proof mass element 100 greater than the latching distance (e.g., from latch 108 to pawl 110), proof mass element 100 will first come into contact with obstructer 74, thereby limiting the amount of movement of proof mass element 100 and preventing an amount of movement of proof mass element 100 that would otherwise cause latch 108 to engage pawl 110. Accordingly, obstructer 74 is attached to substrate 122 at proximal end 130 with sufficient strength to withstand the momentum of proof mass element 100 due to the movement of proof mass element 100 because of experiencing an impact event. As discussed above, distance 124 is less than the latching distance between latch 108 and pawl 110.

In the embodiment illustrated in FIG. 6, obstructer 74 includes an enlarged distal end 132 (distal to proximal end 130) attached to retention element 72 using an adhesive layer 134, and an intermediate portion 136 extending between ends 130 and 132 extending through opening 120. Since micro-sensor 20 is on a micro-scale, distal end 132 is configured having sufficient surface area that adhesive layer 134 remains attached to distal end 132 such that when retention element 72 is removed or pulled away from sensor 20, retention element 72 pulls on enlarged distal end 132 and, in turn, results in a force applied to proximal end 130 of obstructer 74 in a direction away from substrate 122 to cause obstructer 74 to disengage from substrate 122. In the illustrated embodiment, proximal end 130 is configured having a lesser cross-section area than distal end 132, resulting in less surface area of proximal end 130 attached to substrate 122 to enable obstructer 74 to disengage from substrate 122 upon removal of retention element 72 from indicator 10. In some embodiments, proximal end 130 may be formed of a more frangible material than the other parts of obstructer 74 to facilitate the separation of proximal end 130 from substrate in response to removal of retention element 72. In one embodiment, obstructer 74 may be undercut at proximal end 130 to weaken the attachment of obstructer 74 to substrate 122 at proximal end 130. In some embodiments, opening 120 is formed as a circular opening; however, it should be understood that other shapes and/or forms of opening 120 may be formed (e.g., trenches or comb-shaped).

In some embodiments, indicator 10 may be configured to accommodate particular thresholds of impact events by adjusting and/or varying the distance between the latch 108 and the pawl 110, or by varying the weight of proof mass element 100, or by varying the bias of proof mass flexures 104, or some combination of all these of the variables. FIG. 5 illustrates indicator 10 for detecting impact events in a single direction (e.g., the direction of force $F_G$). However, it should be understood that impact indicator 10 may be configured for multi-axis impact event monitoring by adding additional latches, pawls and contact areas on a single proof mass element 100 or having multiple proof mass elements 100 with different force direction configurations.

Figure 7:
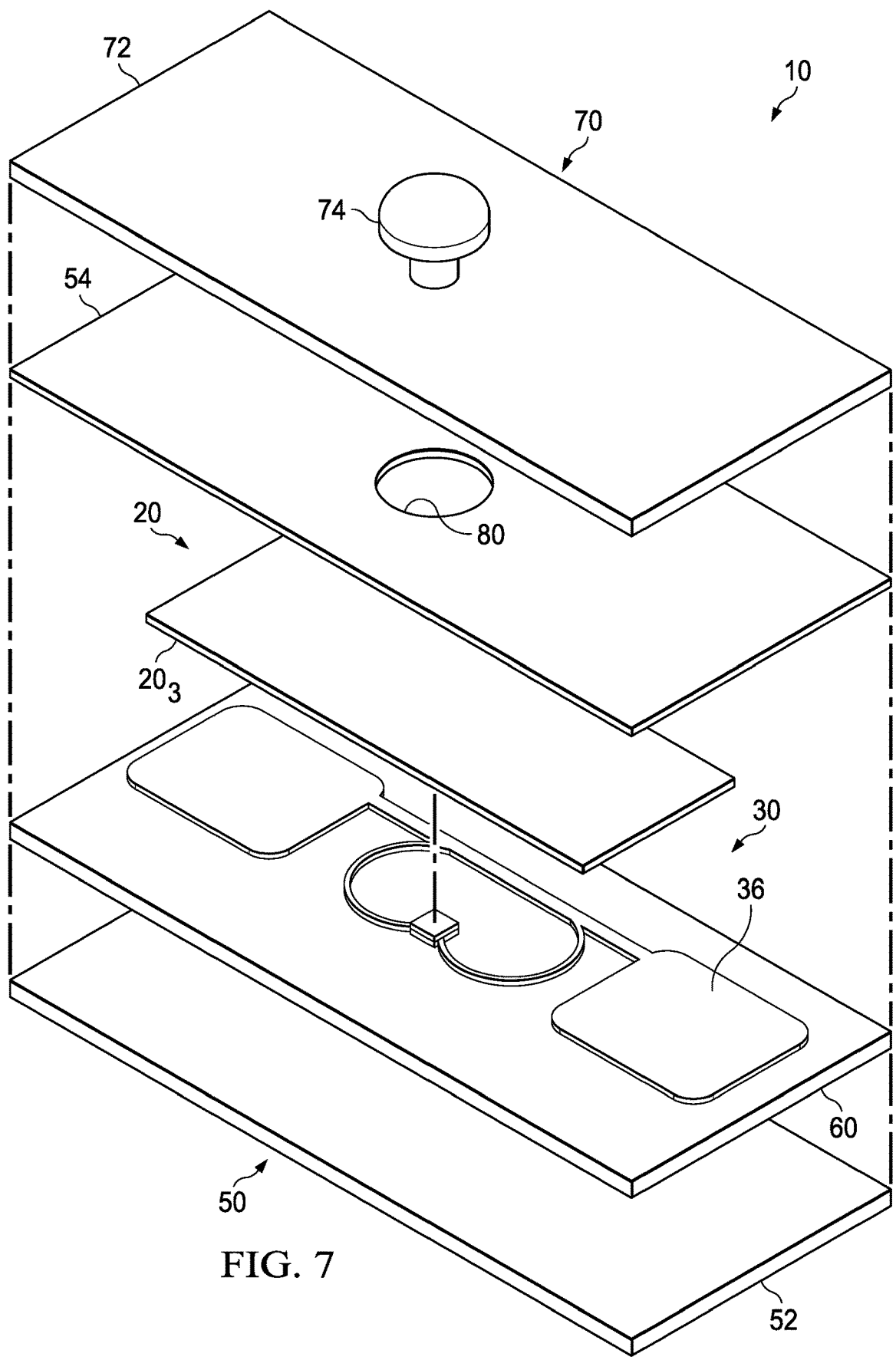
FIG. 7 is a diagram illustrating an exploded view of another embodiment of an impact indicator according to the present disclosure.
Figure 8:
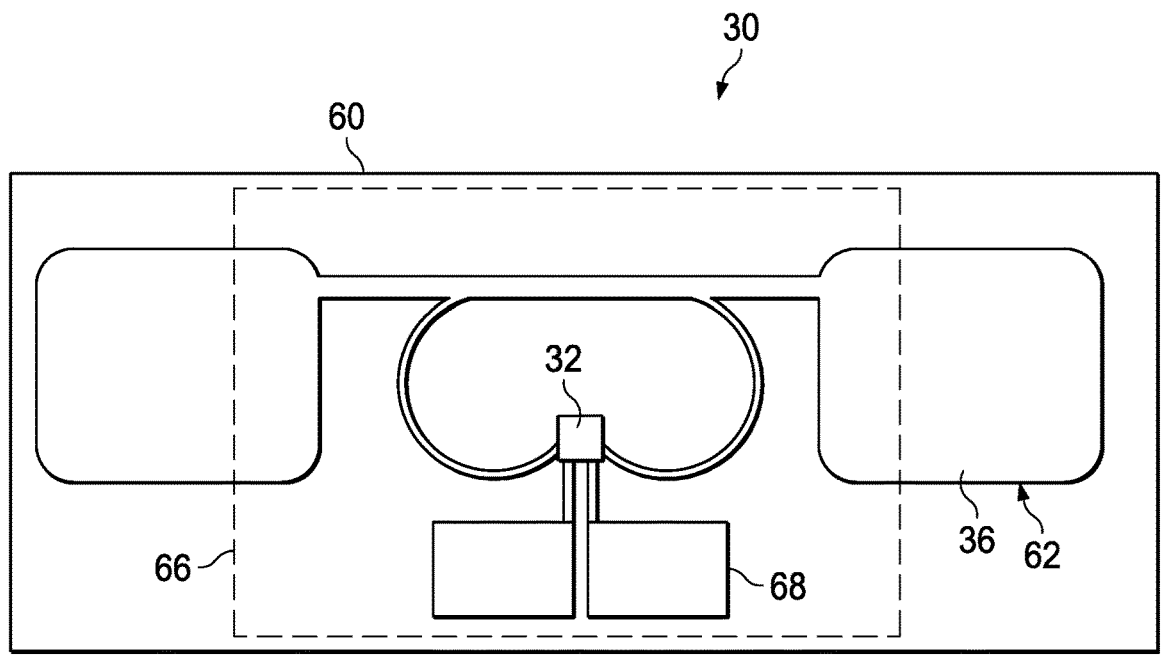
FIG. 8 is a diagram illustrating an enlarged view of a portion of the impact indicator illustrated in FIG. 7 in accordance with the present disclosure.

FIG. 7 is a diagram illustrating an exploded view of another embodiment of the impact indicator 10 according to the present disclosure, and FIG. 8 is a diagram illustrating an enlarged view of a portion of an embodiment of the impact indicator 10 depicted in FIG. 7 according to the present disclosure. Referring to FIG. 7, indicator 10 includes the case or housing 50 having the bottom or lower wall 52 and the top or upper wall 54. Between the upper and lower walls 54 and 52, respectively, is the RFID module 30. FIG. 8 illustrates an enlarged view of the RFID module 30. In FIGS. 7 and 8, RFID module 30 includes the substrate 60 having the RFID inlay 62 forming antenna 36 along with the RFID chip or circuit 32 coupled thereto. In the illustrated embodiment, micro-sensor 20 is adhered and/or coupled to RFID module 30. For example, in the illustrated embodiment, sensor 20 may include a R2R micro-sensor $20_3$. Referring to FIG. 4, RFID module 30 includes a mounting area 66 for receiving micro-sensor 20, and RFID module 30 also includes traces or leads 68 for communicatively and/or electrically coupling sensor 20 to RFID circuit 32.

Referring to FIG. 7, in the illustrated embodiment, indicator 10 includes the activator element 70 for maintaining sensor 20 in a non-reactive state (i.e., unable to transition from an unactuated state to an actuated state) until removal of activator element 70 from indicator 10. For example, during shipment of indicator 10 to an end user (or otherwise), indicator 10 may be subjected to an impact event that would be detected by sensor 20 and cause sensor 20 to be in an actuated state (i.e., indicating the receipt of an impact event). Activator element 70 prevents sensor 20 from transitioning from an unactuated state to an actuated state even if an impact event is experienced by sensor 20. Removal of activator element 70 from indicator 10 places sensor 20 in an active or sensing mode (i.e., capable of detecting an impact event and transitioning to an actuated state to indicate the receipt of the impact event).

In the illustrated embodiment, activator element 70 includes the retention element 72 that is adhesively adhered to upper wall 54 that includes the obstructer 74 that extends downward through the opening 80 formed in upper wall 54. Obstructer 74 may be in the form of a pin or other structural member that extends downward and engages at least a portion of sensor 20 to prevent sensor from actuating. In operation, removal of retention element 72 from indicator 10 (e.g., peeling retention element 72 away from upper wall 54) also results in obstructer 74 being pulled outwardly from indicator 10, thereby disengaging from sensor 20 and enabling sensor 20 to be actuated in response to sensor 20 detecting an impact event.

Figure 9A:
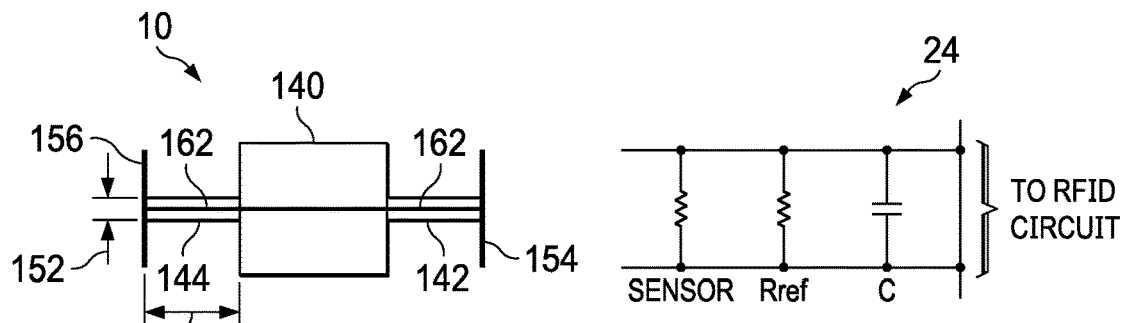
FIGS. 9A and 9B are diagrams illustrating another embodiment of an impact indicator in a pre-activated and activated state, respectively, in accordance with the present disclosure.
Figure 9B:
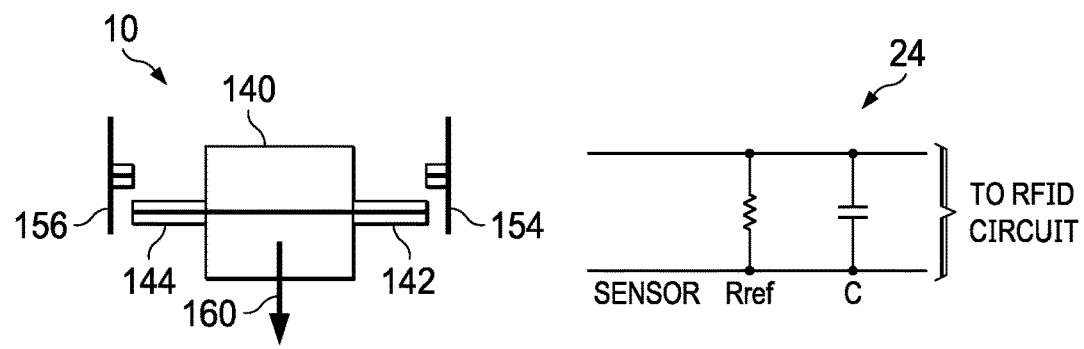

FIGS. 9A and 9B are diagrams illustrating another embodiment of the impact indicator 10 in accordance with the present disclosure. FIG. 9A illustrates an embodiment of LCD panel-fabricated micro-sensor $20_2$ in an unactuated state, and FIG. 9B illustrates an embodiment of LCD micro-sensor $20_2$ in an actuated state. Although FIGS. 9A and 9B refer to a LCD panel-fabricated micro-sensor $20_2$, it should be understood that a MEMS-based or R2R-manufactured micro-sensor 20 may be similarly configured. In the illustrated embodiment, sensor $20_2$ includes a proof mass element 140 supported by beams 142 and 144. In the illustrated embodiment, two beams 142 and 144 are depicted; however, it should be understood that a fewer or greater quantity of beams may be used. In some embodiments, proof mass element 140 and beams 142 and 144 are formed from glass substrate materials via LCD manufacturing techniques. Additionally, beams 142 and 144 are sized and/or otherwise configured to break or fracture at a certain level of impact force. For example, in some embodiments, beams 142 and 144 may be configured having a length, indicated by reference 150 in FIG. 9A, sized at a desired factor greater than a width, indicated by reference 152 in FIG. 9A. In the illustrated embodiment, beams 142 and 144 extend outwardly from respective support elements 154 and 156 to thereby suspend mass element 140 above an underlying substrate. It should be understood that mass element 140 may also be configured to reside on an underlying substrate provided a friction level is minimal to enable movement of mass element 140 relative to such substrate in response to receipt of an impact event. In some embodiments, length 150 may be sized at a factor of five to ten the value of width 152 to accommodate a fracture of beams 142 and 144 at a particular level or threshold of force corresponding to an impact event (e.g., 25g). The size of mass element 140 may also be varied to accommodate a desired actuation of sensor $20_2$ at a particular level of impact.

In operation, in response to receipt of an impact event in the direction indicated by reference 160, mass element 140 is forced in the direction 160 thereby causing beams 142 and 144 to fracture. Thus, in response to the impact event, mass element 140 moves from a first position associated with an unactuated state of indicator 10 (FIG. 9A) to a second position associated with an actuated state of indicator 10 (FIG. 9B).

FIGS. 9A and 9B also illustrate an exemplary state of detection circuitry 24 associated with respective unactuated and actuated states of sensor $20_2$. For example, in some embodiments, detection circuitry 24 may include a conductive trace 162 extending across beams 142 and 144 and mass element 140 and be coupled to RFID circuit 32. It should be understood that detection circuit 24 may be otherwise formed (e.g., an electrically conductive coating applied to beams 142 and 144 and mass element 140). As illustrated in FIG. 9A, detection circuitry 24 includes a resistance associated with sensor $20_2$ in an unactuated state (FIG. 9A) thereby having a particular RC value for circuitry 24. However, in an actuated state of sensor $20_2$, the lack of a resistance associated with sensor $20_2$ causes a change in the RC value of circuitry 24. RFID circuit 32, being coupled to circuitry 24, is configured to detect the different RC values and cause a particular value to be output by RFID module 30 when queried (e.g., value 44 in an unactuated state and value 42 in an actuated state). Further, in the illustrated embodiment, detection circuitry 24 is configured being irreversible such that after actuation of sensor $20_2$, detection circuitry 24 is prevented from returning to its previous unactuated state (e.g., the fracture of beams 142 and 144 irreversibly break the continuity of the trace 162).

Thus, embodiments of the present disclosure enable impact and/or acceleration event detection using an impact indicator having a small footprint using a mechanical shock monitoring device with a passive RFID tag that gives a different reading depending upon the status of the impact switch circuitry. Because the RFID tag is passive, the impact indicator does not need a battery or other external power source. Further, the configuration of the impact indictor enables the impact indicator to be irreversible once activated (or subjected to a sufficient magnitude of impact event). Additionally, the impact indicator of the present disclosure may be configured with a single or multiple indication mechanisms (e.g., an LCD panel-fabricated sensor 20 may include a liquid that may be visible within a certain area of the indicator 10 upon actuation). Further, a variety of fabrication processes may be used for indicator 10 (e.g., any fabrication process that realizes a single thick micromechanical structural layer with 1) conducting sidewalls that can make electrical contact, and 2) a suspended inertial mass sized or configured according to a desired shock detection threshold). Examples include bulk micromachining and wafer-bonding fabrication approaches in silicon, silicon dioxide, ceramic, nickel, titanium and other conductors, as well as LIGA-type fabrication processes (i.e., lithography, electroplating and moulding) using electroplated metals, and additive fabrication methods such as ink-jet dispense, paste screening, and other deposition methods using liquids which then become solidified.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An impact indicator, comprising:
   a substrate having a communications module inlay to communicate an actuation status of the indicator;
   a micro-sensor communicatively coupled to the communications module inlay for detecting an impact event, the micro-sensor having irreversible detection circuitry to detect the actuation status; and
   an activator element to maintain the micro-sensor in a non-reactive state until removal of the activator element from the micro-sensor, wherein the activator element includes a retention element coupled to an obstructer, wherein removal of the retention element from the indicator causes removal of the obstructer from the micro-sensor.

2. The impact indicator of claim 1, wherein the obstructer is adhesively coupled to the retention element.

3. The impact indicator of claim 1, wherein the obstructer limits movement of a movable element of the micro-sensor.

4. The impact indicator of claim 1, wherein the micro-sensor is formed on a wafer substrate.

5. An impact indicator, comprising:
   a micro-sensor activatable in response to receipt by the micro-sensor of an impact event, the micro-sensor including detection circuitry changeable from a first state to a second state in response to the activation of the micro-sensor, the detection circuitry prevented from returning to the first state in response to the activation;
   a radio-frequency identification (RFID) module coupled to the detection circuitry, wherein the RFID module outputs a value indicating that the micro-sensor has been activated; and
   an activator element maintaining the micro-sensor in a non-reactive state until removal of the activator element from the micro-sensor, wherein the activator element includes an obstructer configured to limit movement of a movable element of the micro-sensor.

6. The impact indicator of claim 5, wherein the micro-sensor is formed on a wafer substrate.

7. The impact indicator of claim 5, wherein the micro-sensor is formed on a liquid crystal display (LCD) panel substrate.

8. The impact indicator of claim 5, wherein the activator element includes a retention element coupled to the obstructer, wherein removal of the retention element from the indicator causes removal of the obstructer from the micro-sensor.

9. The impact indicator of claim 5, wherein the obstructer extends through the movable element of the micro-sensor.

10. The impact indicator of claim 5, wherein the micro-sensor includes a mass element coupled to at least one beam element, wherein the at least one beam element fractures in response to the micro-sensor experiencing the impact event.

11. The impact indicator of claim 10, wherein the detection circuitry is formed on the at least one beam element.

* * * * *